(No Model.)
W. HOLLOWAY.
GANG PLOW.
No. 395,831. Patented Jan. 8, 1889.
Fig. 1.
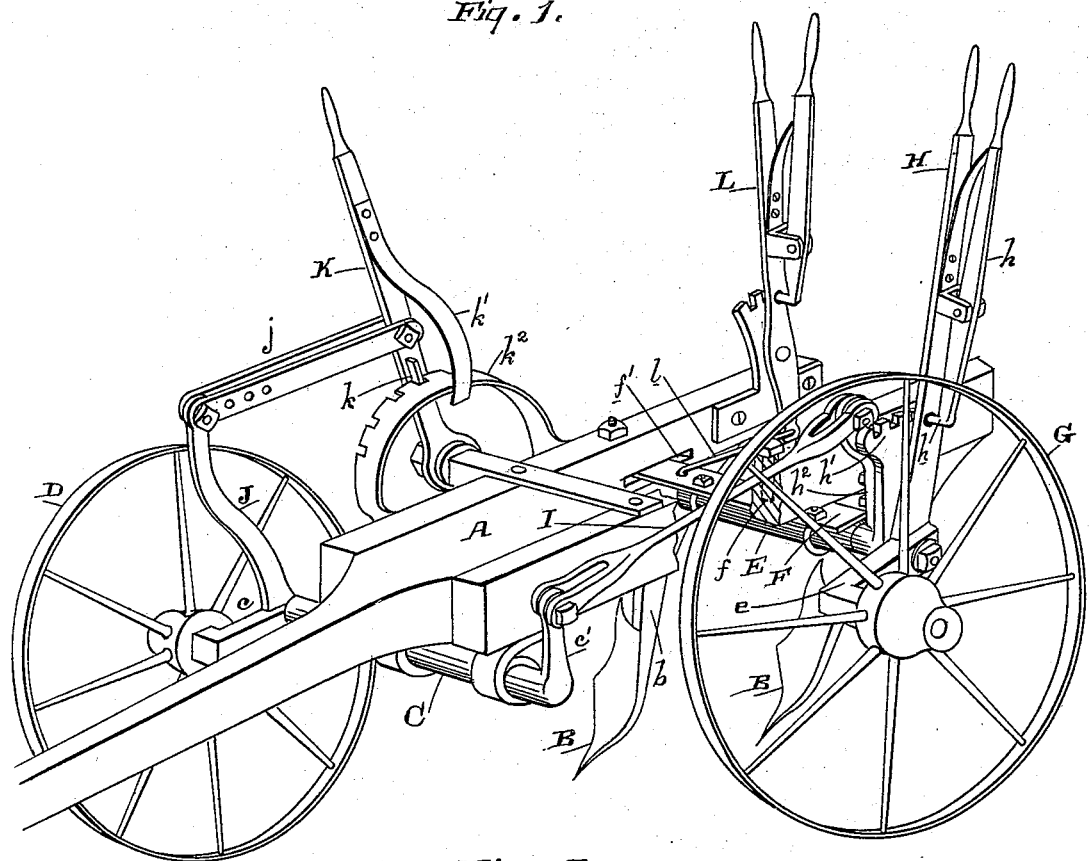
Fig. 2.
Fig. 3.
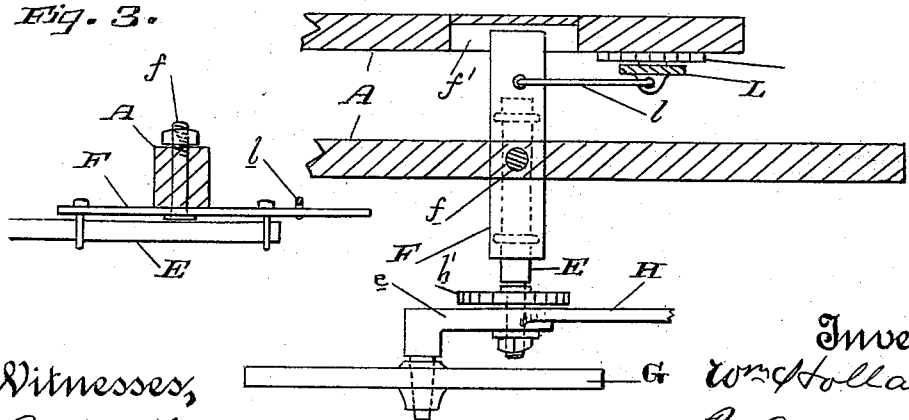
Witnesses,
Geo. H. Strong.
J. H. Rouse
Inventor,
Wm. Hollaway.
By Dewey & Co.
attys

UNITED STATES PATENT OFFICE.

WILLIAM HOLLOWAY, OF GILROY, CALIFORNIA.

GANG-PLOW.

SPECIFICATION forming part of Letters Patent No. 395,831, dated January 8, 1889.

Application filed April 28, 1888. Serial No. 272,173. (No model.)

*To all whom it may concern:*

Be it known that I, WILLIAM HOLLOWAY, of Gilroy, Santa Clara county, California, have invented an Improvement in Gang-Plows; and I hereby declare the following to be a full, clear, and exact description of the same.

My invention relates to the class of gang-plows; and my invention consists in the novel land-gage wheel and the mechanism for operating it, and also in the arrangement of the carrying-wheels, their crank-axles and connections, whereby the plow is regulated as to depth, leveled, and turned to or from the land, all of which I shall hereinafter fully describe.

The object of my invention is to provide a gang-plow having an effective land-gage wheel, whereby I am enabled to dispense with the ordinary landsides on the plow-bottoms, and, generally, to provide a simple and readily-adjustable machine or implement.

Referring to the accompanying drawings for a more complete explanation of my invention, Figure 1 is a perspective view. Fig. 2 is a horizontal section through the beams of the frame to show the bearing-plate F and axle E. Fig. 3 shows the manner of pivoting the bearing-plate to the frame.

A is the plow-frame, to the beams of which are properly secured the standards $b$ of the plow-bottoms B, which are of ordinary construction, with the exception that nothing in the shape of a landside is used.

C is the forward axle, having a crank, $c$, on one end, the journal of which carries the forward wheel, D, which is located in front of the plows and upon the furrow side.

E is the rear axle, which is journaled in a bearing-plate, F, held up under the plow-frame by means of a vertical pivot pin or bolt, $f$, on which said plate may have a slight movement to vary the angle of the axle E to the frame. Upon the outer end of the axle E is pivoted a crank, $e$, the journal of which carries the rear wheel, G, which is the land-gage. Its location is opposite the plows and on the land side, being arranged to travel on the land, and not in the furrow at all. A lever, H, is attached to or formed with the pivoted crank $e$, and said lever carries a spring-controlled pawl, $h$, which is adapted to engage with a rack-segment, $h'$, which is pivoted on the end of the axle E, beside the crank $e$ and lever H. Bolted to the side of the rack $h'$ is an arm, $h^2$, from which a connecting-link, I, extends to a crank, $c'$, on the end of the forward axle, C.

Extending upwardly from the crank $c$, which carries the forward wheel, is an arm, J, from which a link, $j$, (adjustably connected with it by a series of holes and a removable bolt in the ordinary manner,) extends to and is adjustably connected with a lever, K, pivoted to the frame A and having a pawl, $k$, which, under the influence of a spring, $k'$, is adapted to engage a curved rack, $k^2$, whereby the lever is held in position.

At the back of the frame A is pivoted a lever, L, from the lower end of which a connecting-link, $l$, extends to and is connected with the pivoted plate F, which carries the rear axle, E, said plate being guided in its movement by a slotted or grooved bearing, $f'$, at one end.

The operation of the plow is as follows: In order to regulate the depth of the plows or to raise them up, I operate the lever K, so that through the connecting-link $j$ and arm J the crank-axle C is turned, which, through its connecting-link I on the other side, the segment-rack $h'$, pawl $h$, and lever H, turns the crank $e$ on the rear axle, E, and thus the whole frame is raised or lowered on both wheels. To level the frame, which is necessary, by reason of the front wheel traveling in the furrow and the rear wheel on the land, the lever H is operated by releasing it from the rack $h'$, so that it may turn the freely-pivoted crank $e$ without affecting the other connections, and this operation takes place without stopping the horses. To turn the plow to or from the land and gage it properly, the lever L is operated, which, through the link $l$, turns the plate F on its pivot, and thus, through the rear axle, E, turns the wheel G either to or from the land or straight ahead, so that the plow is directed accordingly.

I am aware that plows are known in which the landsides of the plow-bottoms are omitted and a wheel is substituted to serve as a rolling landside; but these wheels are mounted at an angle to the ground and usually have angular or beveled peripheries, and they follow the plows in the furrow made just ahead.

My invention is not to be confounded with these devices, for my wheel G is not of this class. It is simply a gage-wheel to direct the plow to or from the land. Its location directly opposite the plow-bottoms is of advantage in enabling it to better control the direction of the implement and to steady it when gaged.

Having thus described my invention, what I claim as new, and desire to secure by Letters Patent, is—

1. In a gang-plow, the frame, the plow-bottoms carried thereby, and a carrying-wheel on the front of the frame on the furrow side of the plow-bottoms, in combination with the carrying and gage wheel G, mounted opposite to the plow-bottoms and on the land side thereof and arranged to be turned to an angle on either side of the line of travel, whereby the plow is turned to or from the land, substantially as described.

2. In a gang-plow, the frame having the plow-bottoms and the front carrying-wheel on the furrow side, in combination with the rear carrying and gage wheel on the land side, a pivotally-mounted axle carrying said wheel, and a lever and connections with said axle, whereby the gage-wheel may be turned to or from the land, substantially as described.

3. In a gang-plow, the frame having the plow-bottoms and the front carrying-wheel on the furrow side, in combination with the rear carrying and gage wheel on the land side, the axle carrying the wheel, the pivoted bearing-plate carrying the axle, and the lever-and-link connection to the pivoted plate, whereby the gage-wheel may be turned to or from the land, substantially as described.

4. In a gang-plow, the frame having the plow-bottoms, the front crank-axle and carrying-wheel thereon, the rear axle having a pivoted crank and the carrying-wheel on said crank, and the connections, whereby the crank-axles are operated to raise or lower the plow and to level it, consisting of the lever H, connected with the pivoted crank of the rear axle, the pawl of the lever and the independent pivoted rack with which the pawl engages, the lever K, arm J, and connecting-link to the front axle, and the crank $c'$ and connecting-link I to the pivoted rack of the rear axle, substantially as described.

5. In a gang-plow, the frame having the plow-bottoms, the front crank-axle and carrying-wheel on the furrow side, the rear axle pivotally mounted and having a pivoted crank, and the carrying and gage wheel mounted on said crank and opposite the plow-bottoms on the land side thereof, in combination with the lever L and connections for turning the pivoted rear axle and directing the gage-wheel to or from the land, the lever H, connected with the pivoted crank of the rear axle for leveling the plow, and the lever K, and connections between it and the front axle and between the front axle and the crank of the rear axle, whereby the plows are raised or lowered, substantially as described.

In witness whereof I have hereunto set my hand.

WILLIAM HOLLOWAY.

Witnesses:
S. G. BABB,
HENRY C. HOLLOWAY.